(12) United States Patent
Reichen et al.

(10) Patent No.: US 7,568,331 B2
(45) Date of Patent: Aug. 4, 2009

(54) EXTENDABLE LIFT ARMS FOR TRIM MOWER

(75) Inventors: Ronald Lee Reichen, Raleigh, NC (US); Brian Keith Pearman, Apex, NC (US); Todd Allen Link, Apex, NC (US)

(73) Assignee: Deere & Company, Moline, IL (US)

( * ) Notice: Subject to any disclaimer, the term of this patent is extended or adjusted under 35 U.S.C. 154(b) by 277 days.

(21) Appl. No.: 11/313,457

(22) Filed: Dec. 21, 2005

(65) Prior Publication Data

US 2007/0137159 A1   Jun. 21, 2007

(51) Int. Cl.
*A01D 34/00* (2006.01)
(52) U.S. Cl. .................. 56/15.5; 56/7; 56/14.9
(58) Field of Classification Search ........ 56/6, 56/7, 14.7–15.3, 228, 249, 294, 15.5
See application file for complete search history.

(56) References Cited

U.S. PATENT DOCUMENTS

| | | | | |
|---|---|---|---|---|
| 3,608,284 | A | * | 9/1971 | Erdman .................. 56/6 |
| 3,757,500 | A | * | 9/1973 | Averitt ................... 56/6 |
| 4,304,086 | A | * | 12/1981 | Stuchl ................... 56/6 |
| 4,538,400 | A | * | 9/1985 | Hottes ................. 56/11.8 |
| 4,866,917 | A | | 9/1989 | Phillips et al. |
| 5,042,236 | A | * | 8/1991 | Lamusga et al. .......... 56/7 |
| 5,069,022 | A | | 12/1991 | Vandermark |
| 5,261,213 | A | * | 11/1993 | Humphrey .............. 56/2 |
| 5,335,494 | A | | 8/1994 | Benko et al. |
| 5,553,445 | A | * | 9/1996 | Lamb et al. ............. 56/7 |
| 6,032,441 | A | | 3/2000 | Gust et al. |
| 6,082,082 | A | * | 7/2000 | Hunter et al. ........... 56/7 |
| 6,351,929 | B1 | | 3/2002 | Gust et al. |
| 6,758,031 | B2 | * | 7/2004 | Franet et al. ......... 56/14.9 |
| 6,928,798 | B2 | * | 8/2005 | Hensley et al. ....... 56/14.9 |
| 2005/0144922 | A1 | * | 7/2005 | Hensley et al. ....... 56/14.7 |

FOREIGN PATENT DOCUMENTS

EP    1 405 556    4/2004

OTHER PUBLICATIONS

Ball Field Maintenance Equipment, John Deere Golf & Turf, One Source Brochure, 8 Pages.
2500A Triplex Greens Mower, John Deere Gulf & Turf One Source Brochure, 8 Pages.
2653A Professional Utility Mower, John Deere Golf & Turf One Source Brochure, 4 Pages.

* cited by examiner

*Primary Examiner*—Thomas B Will
*Assistant Examiner*—Mai T Nguyen

(57) ABSTRACT

A trim mower includes a frame supported by a plurality of wheels to travel over a ground surface, at least two front reel-type cutting units and at least one rear reel-type cutting unit. A separate lift arm is attached between the frame and each reel-type cutting unit. Each lift arm can pivot to move a reel-type cutting unit between a mowing position on a ground surface and a transport position raised above the ground surface. The lift arm for at least two of the cutting units, and preferably at least one front cutting unit and one rear cutting unit, can extend to selectively move the cutting units attached thereto laterally while the cutting units are in the mowing position. The lateral movement of a front cutting unit may be proportionately further than the lateral movement of a rear cutting unit.

21 Claims, 6 Drawing Sheets

EXTENDABLE LIFT ARMS FOR TRIM MOWER

FIELD OF THE INVENTION

This invention relates generally to grass mowing machines, and particularly to trim mowers used to cut grass on small or enclosed rough and fringe areas, and around bunkers and sand traps of golf courses.

BACKGROUND OF THE INVENTION

Trim mowers, also sometimes referred to as utility mowers, may be used to mow the smaller and/or enclosed rough and fringe areas on golf courses. These areas may be too small or confined for larger mowing machines such as fairway mowers. Trim mowers may include three cutting units powered by and attached to a traction vehicle. For example, two front cutting units may be positioned forward of the vehicle's front pair of wheels, and a rear cutting unit may be between the front wheels and a single rear wheel used for steering. The rear cutting unit may cut a swath between the two front cutting units that overlaps the swaths cut by the two front cutting units.

Trim mowers have a tendency to "crab" when operated on side slopes that have relatively steep inclines or undulations that are common on many golf courses. Crabbing refers to the rear wheel tracking or sliding downhill from the centerline of the trim mower. Crabbing may cause the trim mower to leave uncut strips of grass. This occurs when the rear cutting unit tracks or slides downhill so much that it no longer can overlap the two front cutting units.

To prevent or minimize uncut strips, trim mowers may be designed with additional overlap between the front and rear cutting units. However, greater overlap also can reduce a trim mower's cutting width, resulting in lower productivity of the trim mower in flatter areas. A trim mower is needed having high versatility, and that will prevent or minimize uncut strips without sacrificing productivity.

When trim mowers are used to cut grass at or near the edge of a golf course hazard such as a sand trap or bunker, or other golf course feature, the machine's weight may cause the bunker wall to collapse, especially in sandy soil conditions. Additionally, a trim mower weighing 1000 pounds or more may slide into a sand trap or bunker, get stuck, become high centered, or tip over. A trim mower is needed that will reduce the risk of damage to golf course features such as sand traps or bunkers. A trim mower is needed that will minimize the risk of sliding into a sand trap or bunker, getting stuck, etc.

Efforts have been made to design and make trim mowers that solve one or more of these problems. For example, U.S. Pat. Nos. 6,032,441 and 6,351,929 relate to a triplex trim mower with a pair of laterally adjustable cutting units. The cutting units are supported by a lateral carrier frame which is slidably engaged to a lateral support frame. A hydraulic cylinder permits the carrier frame to be laterally displaced with respect to the vehicle frame so that a cutting unit can to reach the edge of a bunker or sand trap while the vehicle maintains a distance from that feature. When trimming around an obstacle on a slope with the cutting units shifted to the downhill side, the trim mower may become unstable. The instability may result from all cutting units being shifted by a single carrier. The carrier supports its own weight along with the cutting units, cylinders and lift arms. When the single carrier shifts the cutting units to a downhill side, the center of gravity of the mower is moved into a less favorable position that can cause the mower to tip over. If the cutting units are shifted to one side of the machine using the single carrier frame, the opposite side wheel and tire may roll on uncut turf, resulting in poor cut quality and an unsightly cut pattern. Additionally, the hydraulic hoses used to shift the cutting units may be subject to increased wear due to additional flexing and possible rubbing, resulting in leakage of hydraulic fluid onto the turf, and causing damage to the golf course and expensive repairs.

A trim mower is needed that is more stable, especially on steep slopes. A trim mower is needed that will not have a shifting center of gravity if one or more cutting units are extended outwardly. A trim mower is needed that will not cause the uphill tire to roll on uncut turf. A trim mower is needed that will have a better cut quality and cut pattern. A trim mower is needed that will minimize wear of hydraulic system hoses and reduce the risk of leakage of hydraulic fluid.

Other mowers have been proposed with cutting units that can move laterally. For example, U.S. Pat. No. 2,882,978 relates to a selectably slidable, laterally offset mower for trimming beneath overhanging obstacles such as low tree branches. U.S. Pat. No. 4,873,818 relates to a similar mower that provides increased offset capability. U.S. Pat. Nos. 4,893,456 and 5,483,789 relate to single cutting decks that can be laterally displaced from a conventional centered position to a laterally extended position. These devices are not well suited and have not been adapted for use on trim mowers that are used to cut rough and fringe areas on a golf course.

A trim mower is needed that includes a cutting unit that can reach and mow grass in small or enclosed areas of golf courses, especially around the edges of hazards such as sand traps and bunkers, but that will not sacrifice productivity when mowing other areas. A trim mower is needed having increased cutting width without sacrificing necessary overlap between front and rear cutting units. A trim mower is needed that has good stability when a cutting unit is moved laterally. A trim mower is needed that can reduce the risk of damage to the edges of sand traps and bunkers. A trim mower is needed having these features and advantages, and that can also mow at reduced widths on slopes to maximize the overlap and minimize uncut strips of turf.

SUMMARY OF THE INVENTION

The invention provides a trim mower for cutting rough or other confined areas on golf courses, with a cutting unit that is extendable without altering the center of gravity of the mower. The trim mower for cutting rough or other confined areas on golf courses can maximize productivity of the mower by moving the cutting units into a position providing maximum width or cut. The trim mower can reduce the chance of uncut strips due to crabbing during hillside mowing by move the cutting units into a position for maximum overlap between front and rear cutting units. The operator may move the cutting units from maximum overlap to maximum width of cut, as well as one or more positions between the two, to match the terrain. A hydraulic circuit will not allow the cutting units to be lifted while they are in the extended position to prevent a possible unstable condition. The trim mower allows the operator to extend the cutting units out to one side for trimming around bunkers and sand traps without allowing the opposite side wheel to roll on uncut turf.

DESCRIPTION OF THE PREFERRED EMBODIMENT

Figure 1:
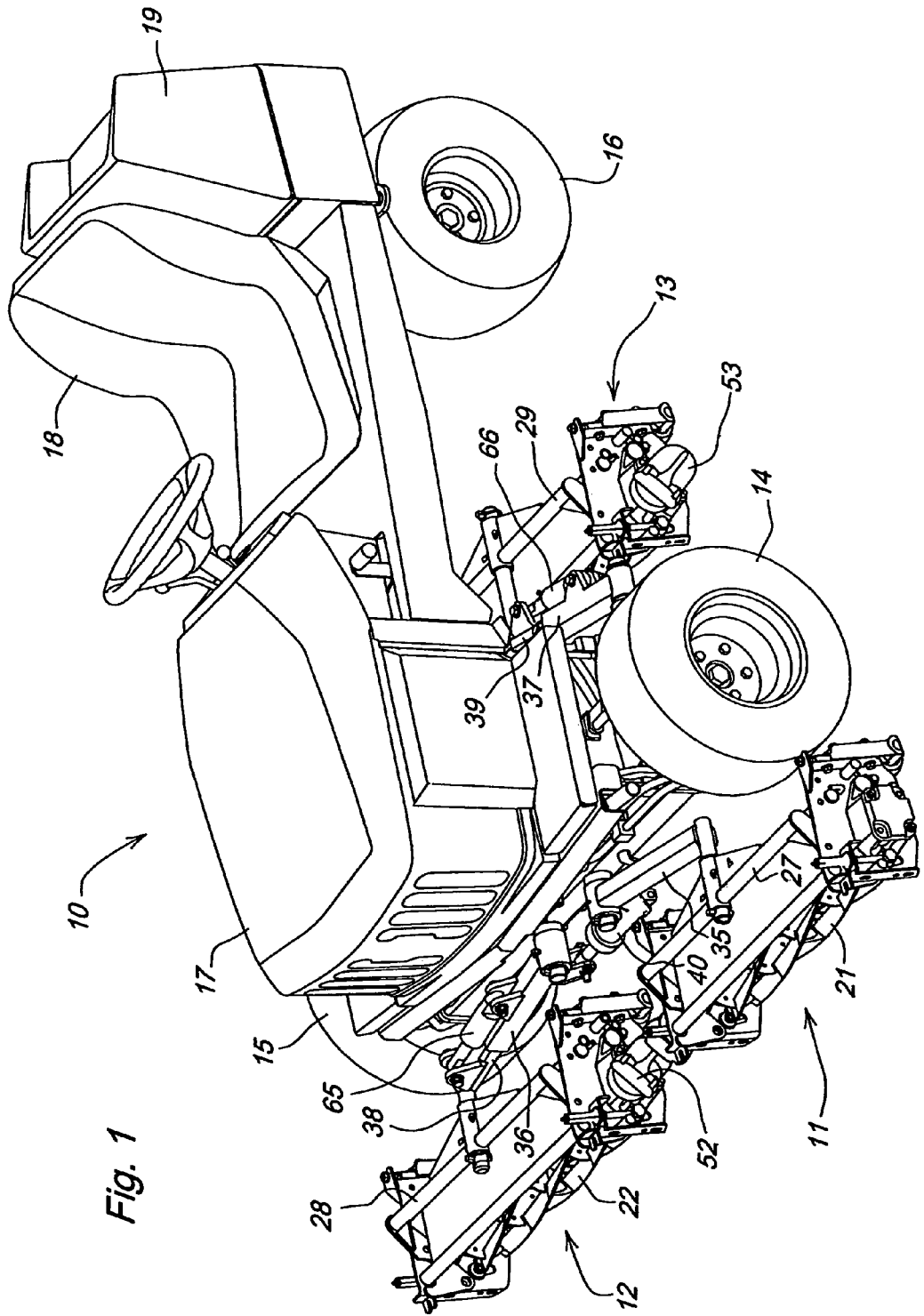
FIG. 1 is a perspective view of a trim mower having extendable lift arms in a first embodiment of the invention, with the cutting units in their center position.

In one embodiment of the invention, self-propelled trim mower 10 is adapted for operating a plurality of reel mower cutting units 11, 12, 13, and preferably at least three cutting units, typically used for mowing golf courses. At least two of the cutting units may be shifted laterally on lift arms. The vehicle may be supported by three or four wheels. In the embodiment shown, the vehicle is supported by front wheels 14, 15 and rear wheel 16. A hydraulic system may drive the cutting units, the vehicle's wheels, and other vehicle components such as a power steering mechanism and lift mechanism which can raise the cutting units to a transport mode. The vehicle may include an engine and engine compartment 17 located near the front of the vehicle between the left and right front wheels. Alternatively, the engine compartment and engine may be over the rear wheel and/or slightly forward of the rear wheel.

In one embodiment, the vehicle may have two driven front wheels 14, 15 and a single driven rear wheel 16 which also may be steerable. The operator seat 18 may be located generally above the rear steerable wheel, laterally between and behind the driven front wheels. A reservoir or tank 19 may be positioned at the rear of the vehicle.

In one embodiment, each of cutting units 11, 12, 13 may be hydraulically or electrically powered by a motor 51, 52, 53. Each cutting unit may have a horizontally aligned reel 21, 22, 23 that cuts the grass between a spiral blade and bedknife. In an alternative embodiment, each cutting unit may include a rotary blade under a deck.

Figure 2:
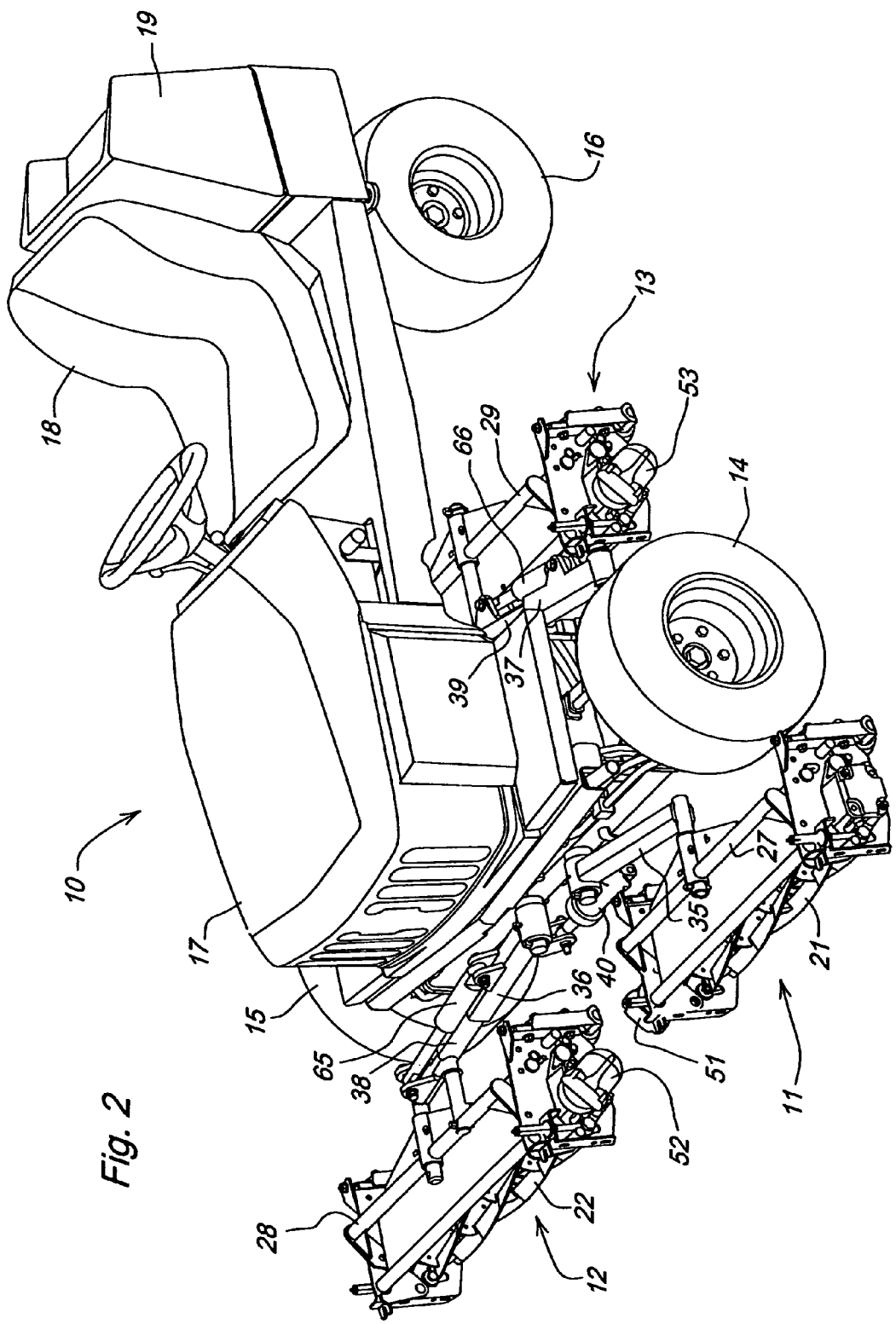
FIG. 2 is a partially cut away perspective view of a trim mower having extendable lift arms in a first embodiment of the invention, with two cutting units in the extended position.
Figure 4:
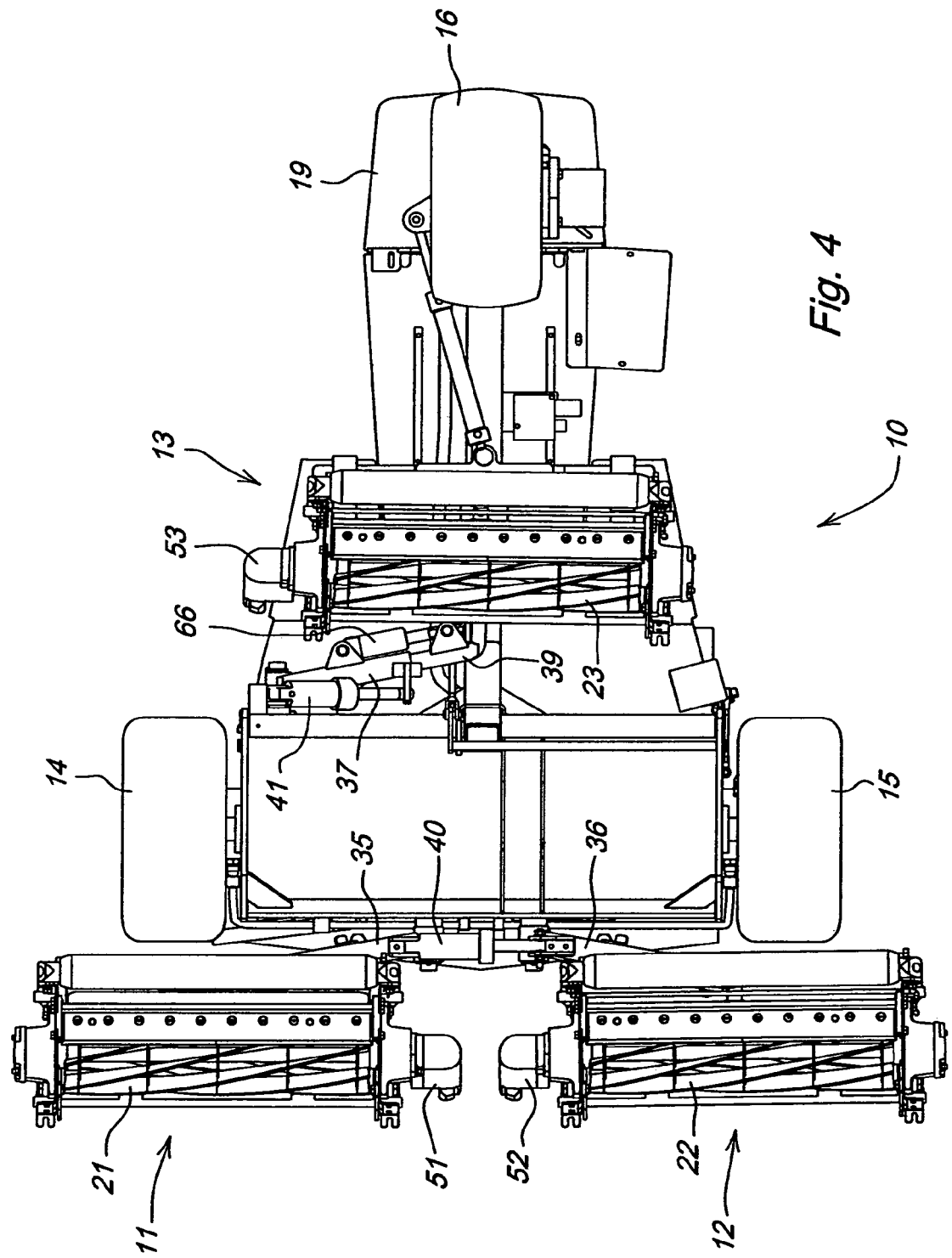
FIG. 4 is a bottom view of a trim mower having extendable lift arms in a first embodiment of the invention, with the cutting units in their center position.
Figure 5:
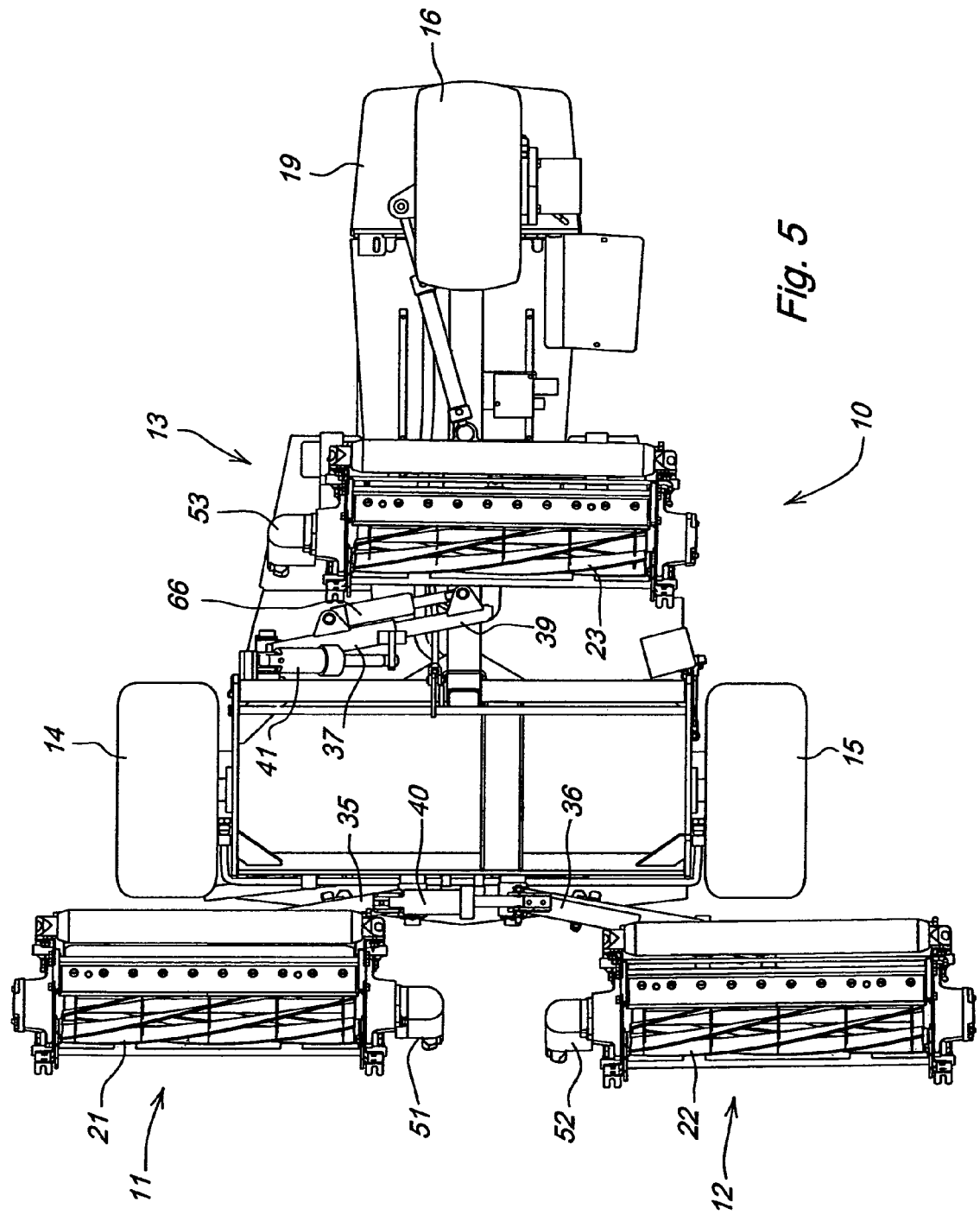
FIG. 5 is a bottom view of a trim mower having extendable lift arms in a first embodiment of the invention, with the cutting units in their extended position.
Figure 6:
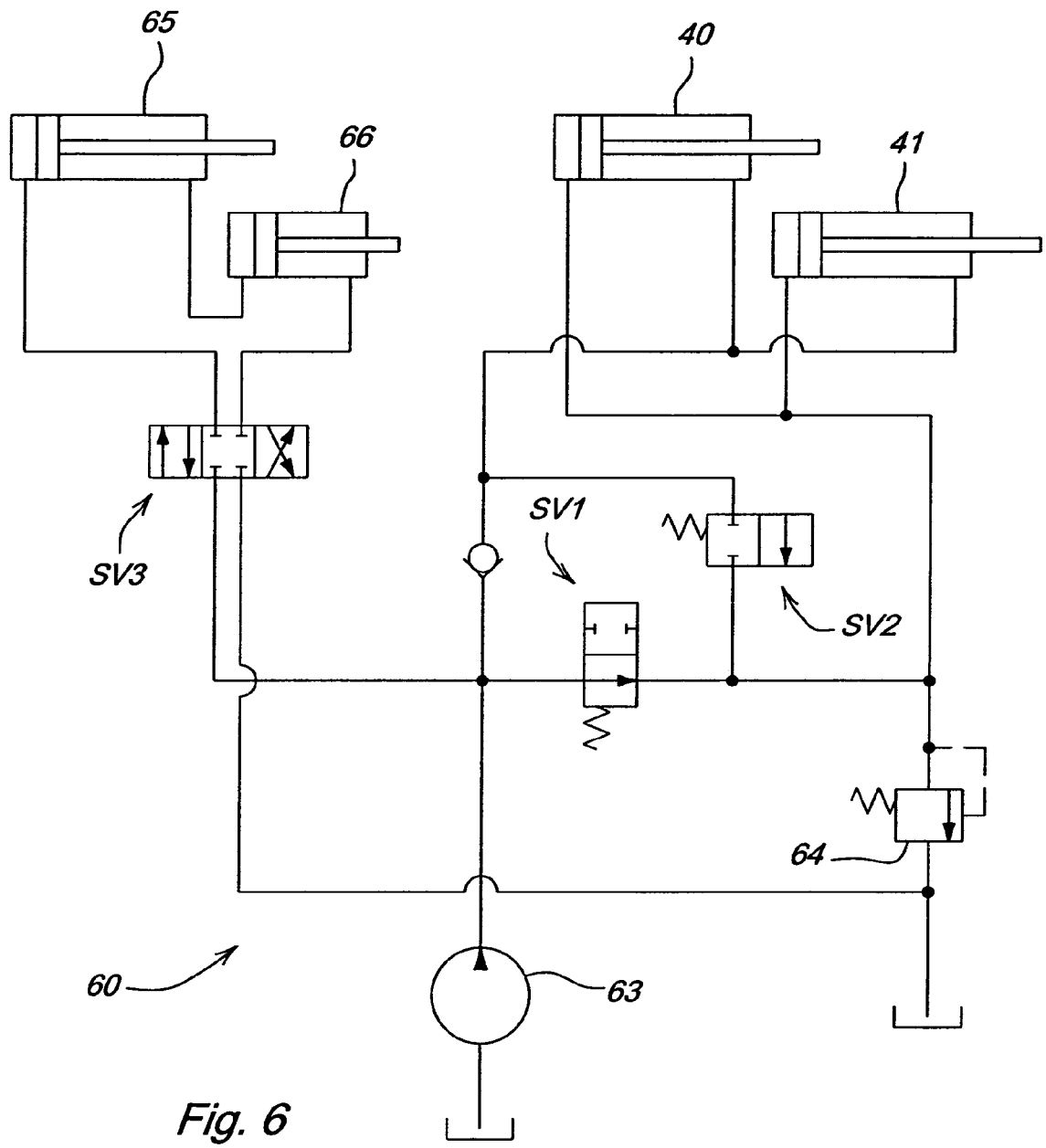
FIG. 6 is a schematic of a hydraulic system for the extendable lift arms in a first embodiment.

In FIGS. 1 and 4, the cutting units are located in a center position. As used herein, the term "center position" refers to the position of the cutting units at the trim mower's minimum cutting width. While the cutting units are at their center position, the lift arms supporting the cutting units are not extended. In FIGS. 2 and 5, cutting units 12 and 13 have been shifted laterally outwardly from the center position to an extended position which may be the trim mower's maximum cutting width.

In one embodiment, the minimum cutting width of the trim mower may be about 8 feet, for example, while the cutting units are in their center positions. The maximum cutting width may be at least about 10% greater than the minimum cutting width. In the embodiment shown, the maximum cutting width of the trim mower may be about 10 feet, while cutting units 12 and 13 are in their extended positions.

In one embodiment, while the cutting units are in their center positions, rear cutting unit 13 may laterally overlap front cutting units 11, 12 by up to about 12 inches on each side. The overlap should be sufficient so that the trim mower will not leave uncut strips while mowing at the minimum cutting width. If cutting units 12 and 13 are shifted laterally outwardly to their extended positions, the rear cutting unit may laterally overlap the front cutting units, but the overlap may be substantially reduced from the overlap with the cutting units in their center positions. For example, the overlap may be less than about 12 inches while cutting units 12 and 13 are in their extended positions.

In one embodiment, cutting units 11, 12, 13 may be coupled to the main frame of the trim mower by support arms 35, 36, 37. A first or inner end of each support arm may be pivotably attached to the trim mower frame so that the support arm may pivot about a generally horizontal axis parallel to the longitudinal axis of the trim mower frame. Optionally, the inner end of each support arm also may pivot about one or more other horizontal or vertical axes.

In one embodiment, one of front support arms 35, 36 may be extendable in length. For example, front support arm 36 may be configured as a two-piece telescoping shaft or rod. In the embodiment shown, front support arm 36 may include extendable section 38 that is pivotably connected to cutting unit 12.

In one embodiment, rear support arm 37 also may be extendable in length. Rear support arm 37 may be a two-piece telescoping shaft or rod including outer section 39 pivotably attached to cutting unit 13. Rear cutting unit 13 may be extended laterally to the same side of the trim mower as the front cutting unit is extended.

FIGS. 2 and 5 show cutting units 12 and 13 shifted laterally outwardly to their extended positions. To shift cutting units between their center and extended positions, the support arms may telescope to increase or decrease their length. The force needed to cause telescoping action of the shift arms may be provided by front and rear hydraulic shift cylinders 65, 66. The shift cylinders may be positioned internal to the telescoping lift arms, or outside and adjacent the lift arms.

Figure 3:
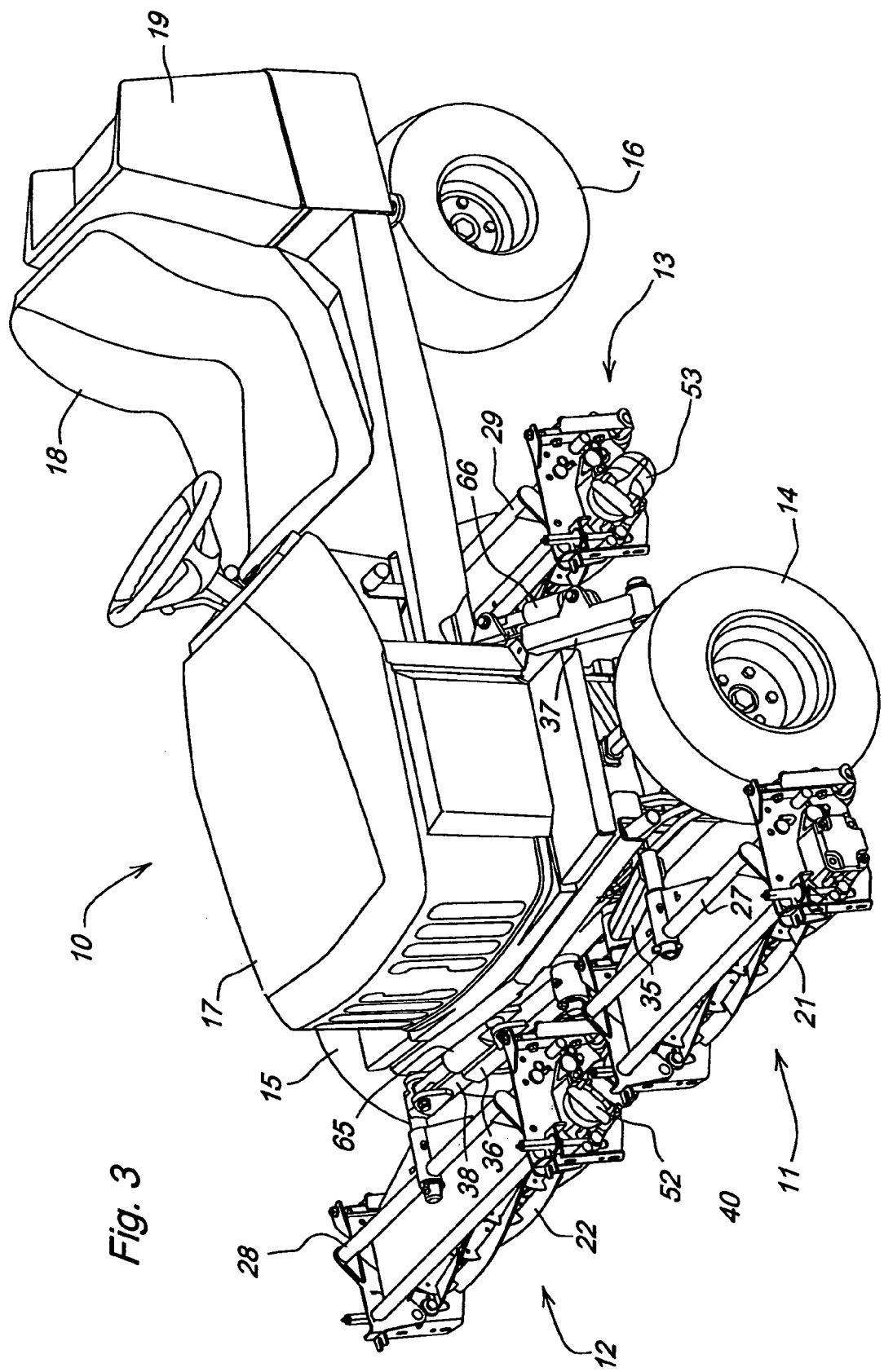
FIG. 3 a partially cut away perspective view of a trim mower having extendable lift arms in a first embodiment of the invention, with the cutting units in the raised position.

In one embodiment, each cutting unit may be raised or lowered by by hydraulic lift cylinders 40, 41, or another electrical or electromechanical device. For example, as shown in FIG. 3, each cutting unit may be raised from a mowing position on the ground surface to a transport position above the ground surface. Additionally, each support arm may provide a downforce, through various alternative means such as hydraulic force or springs, to the cutting unit attached thereto, to assure the cutting unit remains in proper contact with the ground surface and evenly cuts the grass at the desired height during mowing.

In one embodiment, each cutting unit may be pivotably attached to a second or outer end of each support arm by a yoke 27, 28, 29. Each yoke may provide a pivoting connection between the second or outer end of each support arm and the cutting unit so that the cutting unit may pivot on one or more axes, such as a generally vertical axis and/or one or more generally horizontal axes. The pivoting connection also may enable the cutting unit to better follow ground surfaces during mowing. Optionally, this pivoting connection may enable the cutting unit to pivot into a convenient transport position when or after the support arm is raised, so that the cutting unit may be carried within the track width of the trim mower's front wheels and tires.

In one embodiment, shifting a front cutting unit and a rear cutting unit laterally outwardly enables the cutting width of the trim mower to be increased from a minimum cutting width up to a maximum cutting width. For example, the cutting width of the trim mower may be increased from a minimum cutting width of about 8 feet while the cutting units are in their center positions, up to a maximum cutting width of about 10 feet while front cutting 12 and rear cutting unit 13 are in their extended positions. At the maximum cutting width, rear cutting unit 13 may laterally overlap each of front cutting units 11, 12 by less than the overlap at the minimum cutting width. For example, the rear cutting unit may overlap each front cutting unit by up to about 12 inches on each side at the minimum cutting width, and may overlap each front cutting unit by less than about 12 inches at the maximum cutting width.

In one embodiment, the cutting width of the trim mower may be set between the minimum and maximum cutting widths by shifting cutting units 12 and 13 to one or more intermediate positions between the center position and extended position. While cutting units 12 and 13 are shifted, cutting unit 11 may remain fixed in a center position without shifting laterally outwardly.

In one embodiment, the trim mower may have at least three cutting units, and at least two of the cutting units may be shifted laterally on extendable lift arms. For example, the trim mower may include five cutting units, and two or more of the cutting units may shift laterally on extendable lift arms.

In one embodiment, hydraulic system 60 shown in FIG. 5 may be used to shift cutting units 12 and 13 between their center and extended positions, and also to move all of the cutting units between raised and lowered positions. Although a hydraulic system is preferred for shifting the cutting units, other alternative systems and devices such as electrical or electromechanical systems also may be used to shift the cutting units. Hydraulic system 60 may include hydraulic pump 63 to provide hydraulic fluid pressure to the circuit, and charge relief valve 64 to create a back pressure in the system. The hydraulic system may have three controls or solenoids, labeled SV1, SV2 and SV3, that the operator may use to lift, lower and shift cutting units. For example, SV1 and SV2 may control the lift and lower functions of front and rear lift cylinders 61, 62 respectively. These controls enable raising and lowering the cutting units. SV3 may control the shifting of cutting units 12 and 13 between their center and extended positions.

In one embodiment, hydraulic system 60 may include front and rear shift cylinders 65, 66 to shift cutting units 12 and 13 between their center and extended positions. Front and rear shift cylinders 65, 66 may be in a master/slave configuration, and the shift cylinders may move essentially simultaneously. For example, hydraulic fluid displaced from the rod side of front shift cylinder 65 may be directed to the piston side of rear shift cylinder 66.

In one embodiment, the front and rear shift cylinders may be configured and dimensioned so that front cutting unit 12 may shift further laterally from its center position than rear cutting unit 13 shifts from its center position. For example, front cutting 12 may shift up to about 2 feet from the center position, while rear cutting unit may shift up to about 1 foot from the center position. Thus, the shift length of the front cutting unit may be proportional to that of the rear cutting unit, and preferably, front cutting unit 12 may shift about twice as far as rear cutting unit 13. This is to provide equal overlap of cutting unit 13 with respect to cutting units 11 and 12.

In one embodiment, the stroke and bore of each of the front and rear shift cylinders may be dimensioned so that front cutting unit 12 may shift laterally further from its center position, in proportion to rear cutting unit 13. For example, the stroke of the front shift cylinder may be twice the stroke of the rear shift cylinder. As a result, cutting units 12 and 13 may shift proportionally at any point within the stroke range of shift cylinders 65, 66.

In one embodiment, hydraulic system 60 may require front cutting unit 12 and rear cutting unit 13 to shift to their center positions as they are lifted or before they are lifted. The hydraulic system may not lift the cutting units if they are in their extended positions, or an intermediate position between their center and extended positions. Shifting the cutting units to their center positions allows the trim mower to have the most stable platform when the cutting units are raised.

In one embodiment, the shift cylinders may be in parallel with the lift cylinders. With the shift cylinders in parallel with the lift cylinders, by activating the the shift valve any time the lift function SV1 is powered, the cutting units may shift to the center position as they are being lifted or before they are lifted. The cutting units shift to their center position before they are lifted because the force required to lift them is greater than the force required to shift them laterally. As a result, hydraulic fluid takes the path of least resistance through the shift cylinders before the lift cylinders.

Having described the preferred embodiment, it will become apparent that various modifications can be made without departing from the scope of the invention as defined in the accompanying claims.

The invention claimed is:

1. A mowing machine comprising:
   a vehicle with a pair of front cutting units positioned side-by-side and a rear cutting unit positioned behind the front cutting units and laterally overlapping each of the front cutting units;
   a lift arm for the rear cutting unit and a lift arm for one of the front cutting units being extendable to laterally shift the rear cutting unit and one of the front cutting units to change the amount of lateral overlap between the rear cutting unit and each of the front cutting units.

2. The mowing machine of claim 1 further comprising hydraulic cylinders to actuate the lift arm for the front cutting unit and the lift arm for the rear cutting unit.

3. The mowing machine of claim 1 wherein the lift arms for the front cutting unit and the rear cutting unit telescope.

4. The mowing machine of claim 1 further comprising a lift cylinders to lift the cutting units only when the cutting units having lift arms are shifted to a position where lateral overlap between the rear cutting unit and each of the front cutting units is minimized.

5. The mowing machine of claim 1 wherein the lift arm for the front cutting unit can extend further to laterally shift the front cutting unit than the lift arm for the rear cutting unit laterally shifts the rear cutting unit.

6. The mowing machine of claim 1 wherein the cutting units are reel type mowers.

7. A trim mower comprising:
   a vehicle with a frame supported by a plurality of wheels to travel over a ground surface;
   at least two front reel-type cutting units having cutting paths and at least one rear reel-type cutting unit having a cutting path overlapping the cutting paths of the front reel-type cutting units;
   a separate lift arm attached between the frame and each reel-type cutting unit; each lift arm pivotable to move a reel-type cutting unit between a mowing position on a ground surface and a transport position raised above the ground surface;
   the lift arm for at least one front reel-type cutting unit and the lift arm for at least one rear reel-type cutting unit being extendable to laterally shift the cutting units attached thereto and increase or decrease the extent of overlapping cutting paths while maintaining the cutting units in the mowing position, the lateral shifting of the front reel-type cutting unit being proportionately further than the lateral shifting of the rear reel-type cutting unit.

8. The trim mower of claim 7 wherein at least one of the front reel-type cutting units has a fixed lateral position.

9. The trim mower of claim 7 further comprising a hydraulic cylinder connected to each lift arm to selectively lift the cutting unit attached thereto off the ground surface.

10. The trim mower of claim 7 wherein the extendable lift arms are telescoping.

11. The trim mower of claim 7 further comprising a hydraulic motor to power each reel-type cutting unit.

12. The trim mower of claim 7 further comprising two front drive wheels and a rear driven and steered wheel supporting the frame of the vehicle.

13. The trim mower of claim 7 wherein at least one rear cutting unit overlaps each front cutting unit in any lateral position.

14. A grass mowing machine comprising:
a wheeled vehicle having an engine and a frame;
at least three lift arms, each lift arm having a first end connected to the frame and a second end connected to a cutting unit; at least two of the lift arms being extendable;
each lift arm having a lift mechanism to selectably cause the lift arm to pivot and move the cutting units connected thereto between lowered and raised positions, and each extendable lift arm having a shift mechanism to laterally shift the cutting units connected thereto to vary the overlap of the cutting units in a plurality of mowing positions; wherein
one of the cutting units having a lift arm that is extendable is positioned rearwardly of the other cutting units.

15. The grass mowing machine of claim 14 wherein the vehicle has at least two front wheels, at least two of the cutting units are positioned in front of the front wheels, and at least one cutting unit is positioned behind the front wheels.

16. The grass mowing machine of claim 14 wherein the lift mechanisms and shift mechanisms are hydraulic cylinders.

17. The grass mowing machine of claim 14 further comprising a hydraulic pump providing pressurized hydraulic fluid to a hydraulic motor for each wheel.

18. The grass mowing machine of claim 14 wherein one of the extendable lift arms extends further to laterally shift a cutting unit than the other extendable lift arm.

19. The grass mowing machine of claim 14 wherein the lift mechanisms can lift the cutting units connected thereto only when the shift mechanisms are not extended.

20. The grass mowing machine of claim 14 wherein the cutting units are horizontal cutting reels.

21. A grass mowing machine comprising:
a wheeled vehicle having an engine and a frame;
at least three lift arms, each lift arm having a first end connected to the frame and a second end connected to a cutting unit; at least two of the cutting units being front cutting units and at least one of the cutting units being a rear cutting unit;
each lift arm having a lift mechanism to selectably cause the lift arm to pivot and move the cutting units connected thereto between lowered and raised positions, at least one of said lift arms connected to one of said front cutting units and the lift arm connected to the rear cutting unit each having a shift mechanism to move the cutting units connected thereto laterally to vary the amount of overlap between the front cutting units and the rear cutting units;
wherein the lift mechanisms can lift the cutting units connected thereto only when the shift mechanisms are not extended.

* * * * *